United States Patent [19]
Hetzner

[11] Patent Number: 5,861,067
[45] Date of Patent: Jan. 19, 1999

[54] STEEL MACHINE COMPONENT HAVING REFINED SURFACE MICROSTRUCTURE AND PROCESS FOR FORMING THE SAME

[75] Inventor: Dennis W. Hetzner, Jackson Township, Ohio

[73] Assignee: The Timken Company, Canton, Ohio

[21] Appl. No.: 512,470

[22] Filed: Aug. 8, 1995

[51] Int. Cl.[6] .............................. C21D 1/09; C21D 9/36; C22C 38/00
[52] U.S. Cl. ...................... 148/326; 148/328; 148/512; 148/525; 148/529; 148/903; 384/912; 384/625
[58] Field of Search .................................. 148/224, 902, 148/903, 906, 320, 328, 326, 512, 525, 526, 529; 384/625, 912

[56] References Cited

U.S. PATENT DOCUMENTS

| | | | |
|---|---|---|---|
| 3,388,618 | 6/1968 | Evancic et al. | . |
| 3,773,565 | 11/1973 | Pye et al. | . |
| 3,929,523 | 12/1975 | Kinashi et al. | 148/526 |
| 4,533,815 | 8/1985 | Ecer | . |
| 5,084,116 | 1/1992 | Mitamura | 148/319 |
| 5,468,308 | 11/1995 | Braza et al. | 148/512 |

OTHER PUBLICATIONS

Metal Science and Heat Treatment, vol. 33, No. 1/02, 1 Jan. 1991, pp. 87–93, XP000261882 Astapchik S A et al: "Structural And Phase Transformations In Steels And Alloys In Laser Heat Treatment".

Metal Science And Treatment, vol. 34, No. 7/08, 1 Jul. 1992, pp. 446–451, XP000338623 Shul'GA A A: "Electron–Beam Treatment Of Bearing Steels".

SKF Technology Services, High Fracture Toughness Bearing Development, 1981.

SKF Technology Services, High Energy Beam Hardening of Bearing Rings, 1983.

Behr et al.., Studies On Laser Hardening of Tools Made from High–Speed Steel S 6–5–2 (Thyrapid 3343), pp. 5–8, 1990.

J. Kusinski, Laser Melting of TI–High Speed Tool Steel, Mettalurgical Transactions A, vol. 19A, Feb. 1988, pp. 377–382.

L. Ahman, Microstructure and Its Effect on Toughness and Wear Resistance of Laser Surface Melted and Post Heat Treated High Speed Steel, Mettalurgial Tansactions A, vol. 15A, Oct. 1984, pp. 1829, 1832–1838.

Young–Won Kim et al., Laser Melting and Heat Treatment of M2 Tool Steel: A Microstructural Characterization, Mettalurgial Transactions A, vol. 10A, Jul. 1979, pp. 881–886.

*Primary Examiner*—Deborah Yee
*Attorney, Agent, or Firm*—Polster, Lieder, Woodruff & Lucchesi, L.C.

[57] ABSTRACT

A machine component which is formed from a high alloy steel has, along a surface where the component is subjected to cyclic loading, a glaze in which the steel has a refined microstructure that resists spalling. Whereas the microstructure of the core underlying the glaze contains carbides of relatively large particle size, the microstructure of the glaze contains carbides of a much smaller particle size. For the most part the microstructure of the glaze comprises martensite and retained austenite in a fine dendritic network. The glaze is acquired by directing a laser beam at the surface, with the beam having sufficient energy and intensity to melt the component where it illuminates the surface, thus creating a puddle. Relative motion between the beam and the component advances the puddle over the surface. The molten metal in the previously illuminated region loses its heat to the underlying core of the component and solidifies, in effect undergoing a self-quench. The solidification is rapid enough to prevent the formerly dissolved carbides from consolidating into large particles and to prevent the martensite and retained austenite from growing into large grains.

22 Claims, 7 Drawing Sheets

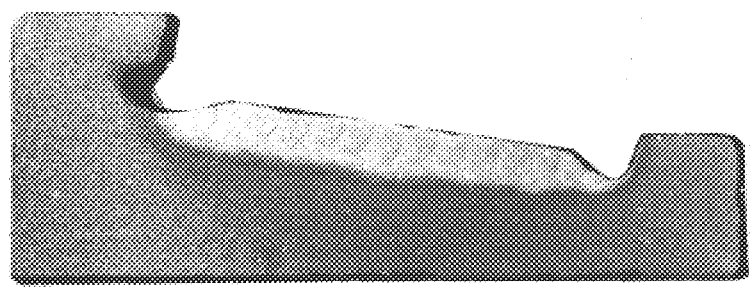
FIG. 3A  |— 4mm —|
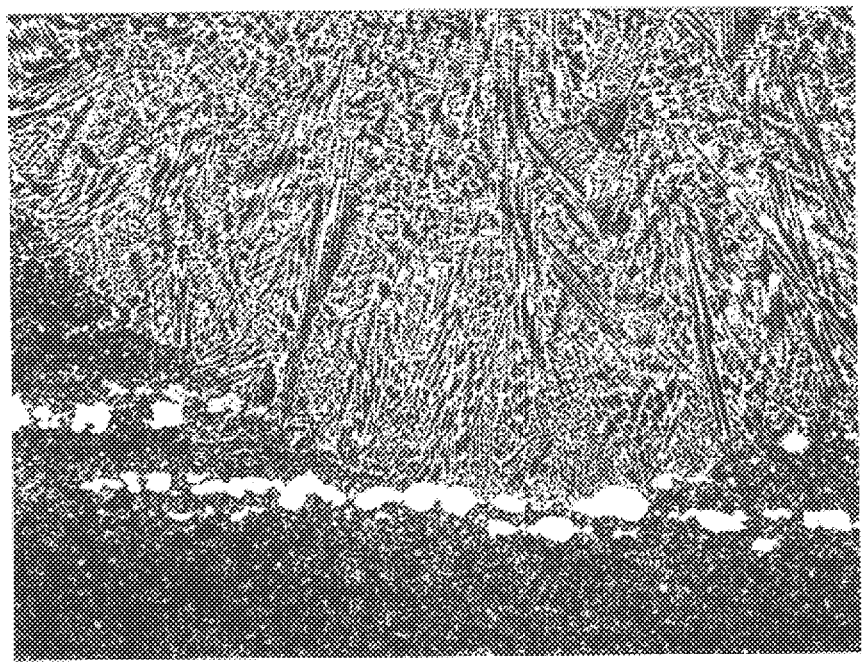
GLAZE
CORE
FIG. 3B  |— 100μm —|

FIG. 4A  |—4mm—|
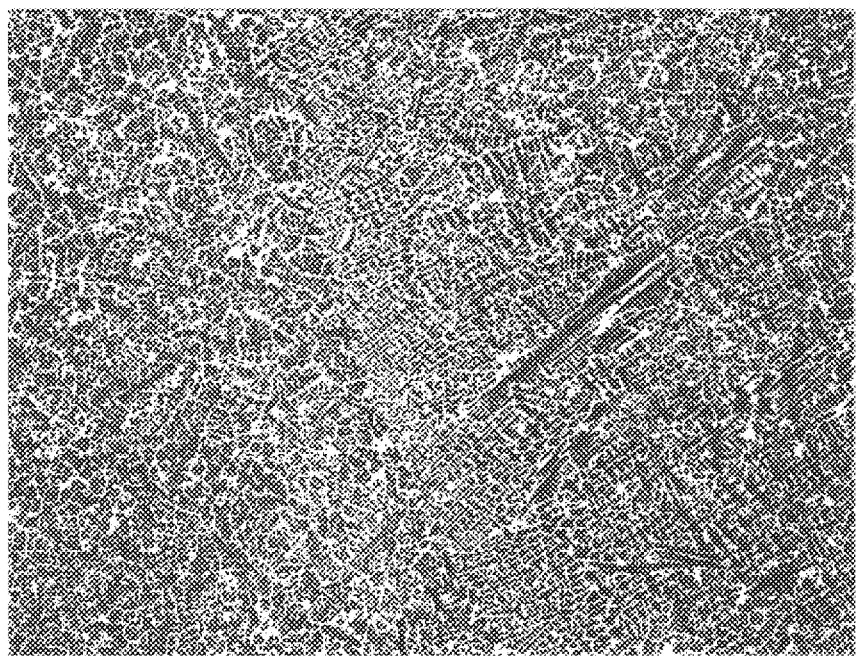
GLAZE
FIG. 4B  |—100μm—|

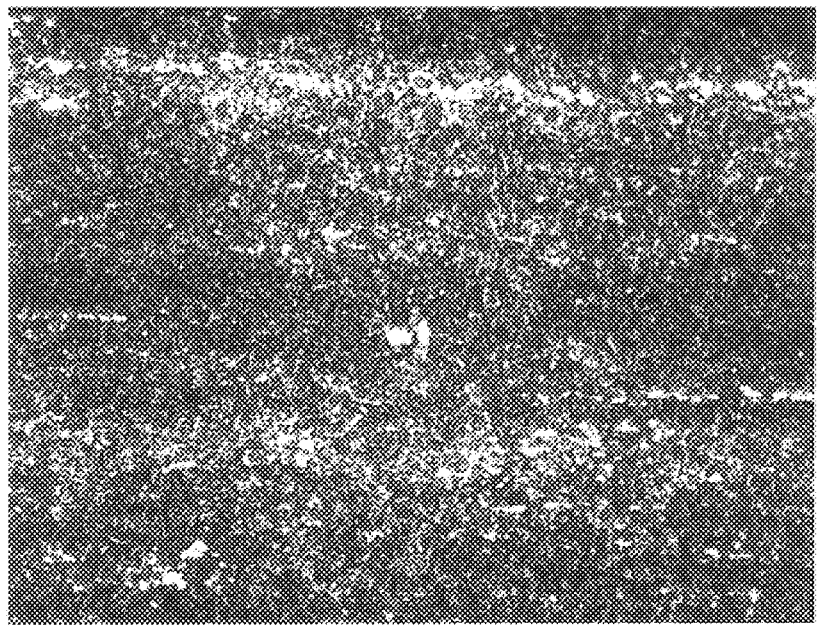
CORE

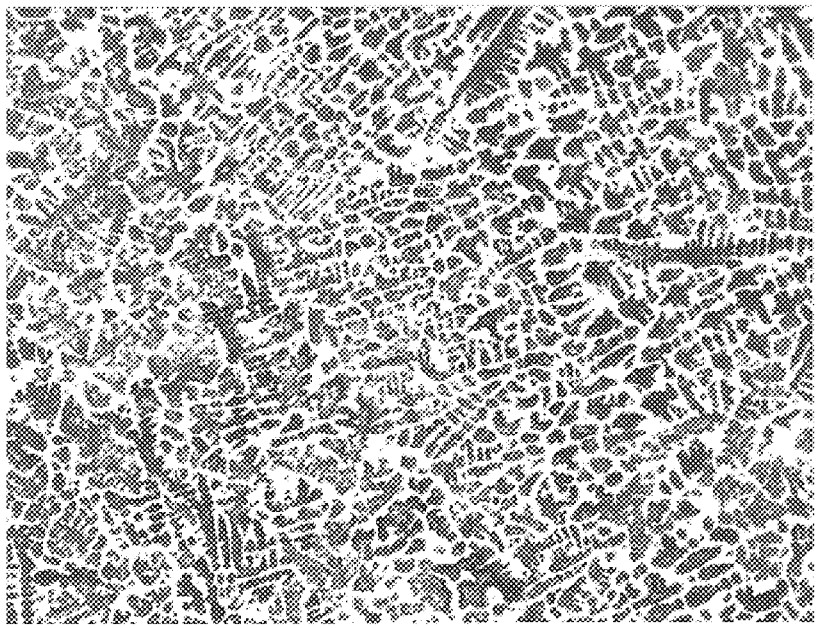
GLAZE

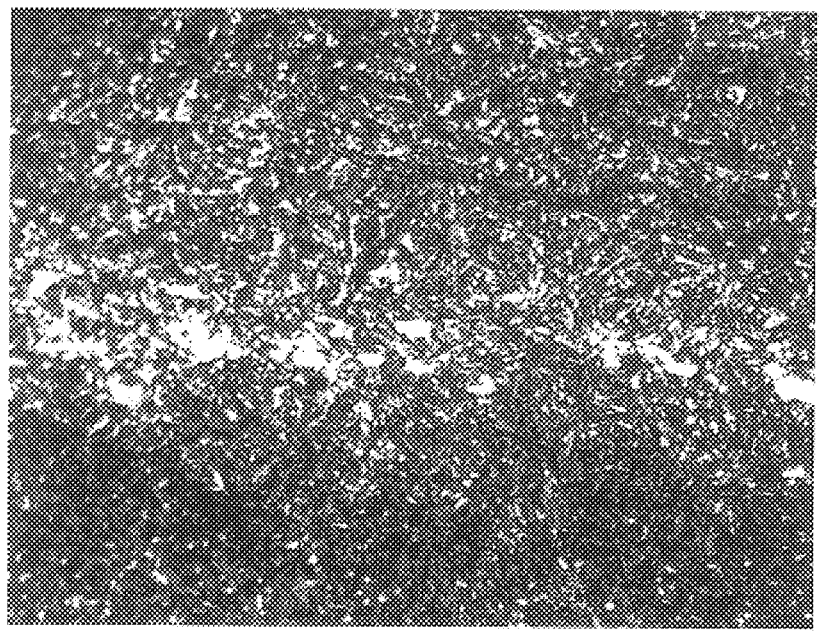
FIG. 4E  |— 40 μm —|
CORE
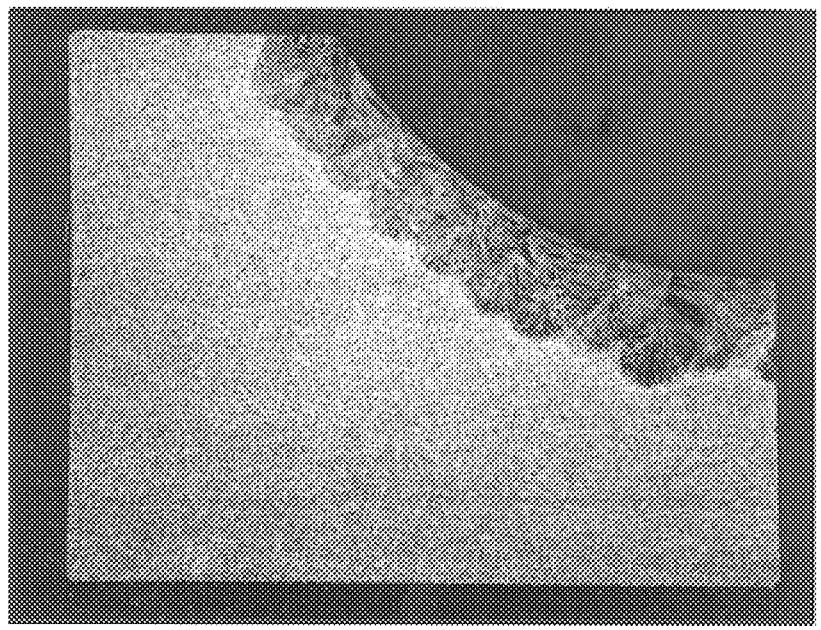
FIG. 6A  |— 2 mm —|

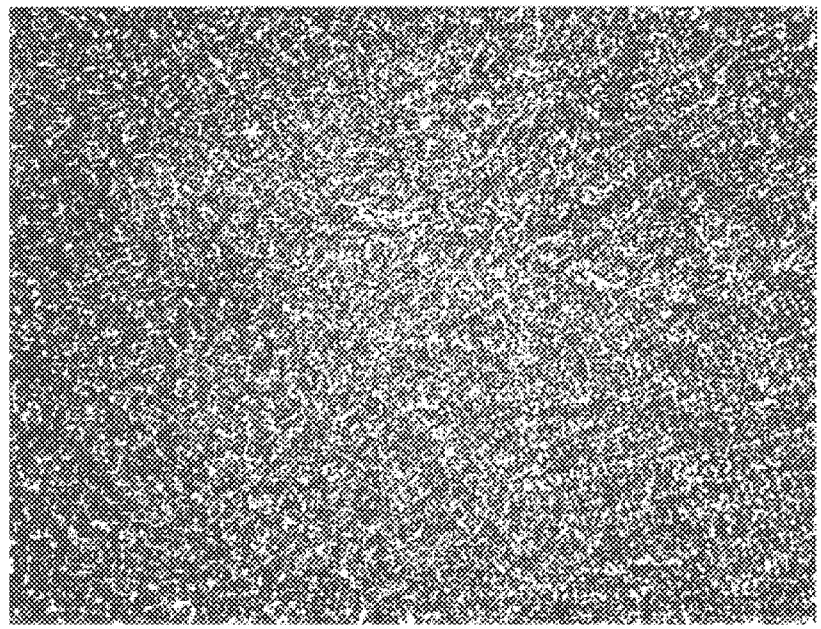
GLAZE

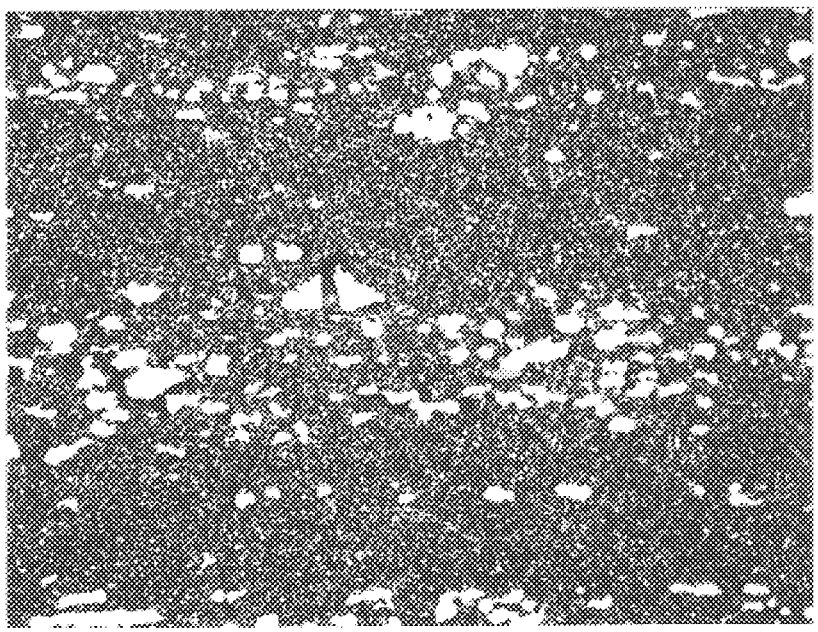
CORE

STEEL MACHINE COMPONENT HAVING REFINED SURFACE MICROSTRUCTURE AND PROCESS FOR FORMING THE SAME

BACKGROUND OF THE INVENTION

This invention relates in general to high alloy steel that is subjected to cyclic loading and more particularly to a process for creating on a surface of a machine component made from high alloy steel a glaze having a refined microstructure that enables the component to better withstand cyclic loading and to a machine component having such a glaze.

The typical antifriction bearing in its most basic configuration has two races, each provided with a raceway, and rolling elements which are located between the races and roll along the raceways when one of the races rotates relative to the other race. Rolling, as opposed to sliding, which is characteristic of sleeve bearings, produces relatively little friction, and hence bearings with rolling elements are aptly called antifriction bearings. These bearings assume several configurations. In some the rolling elements are balls and the raceways are concave to conform to the curvature of the balls. Others have cylindrical rollers, while still others have tapered rollers.

Irrespective of their configuration, the rolling elements concentrate the load in the limited areas where the contact exists. The raceways must withstand these loads without permanent deformation and further must experience very little wear. To this end the races along their raceways are quite hard. Apart from that, the rolling elements apply cyclic stresses to the raceways, so the races along their raceways must likewise resist spalling which tends to occur in the presence of cyclic stresses. In other words, the races must have an acceptable life.

For most applications requiring antifriction bearings, plain carbon steels serve well for the races and the rolling elements of those bearings. Some manufactures use low carbon alloy steels which, once machined to the proper configuration, are case-hardened and heat treated to provide the hard wear-resistant surfaces. Others use a tempered steel with a greater carbon content, and induction harden that steel along the raceways and the surfaces of the rolling elements. Still others use through-hardened steel, likewise of greater carbon content. Irrespective of the carbon content of the steels, the races along their raceways and the rolling elements along their exterior surfaces are hard enough to resist deformation and withstand wear. Moreover, heat treatments leave the microstructure along the critical surfaces of the races and rollers with small carbides—mostly cementite or iron carbide—so the bearing will have an acceptable fatigue life.

Some bearings, however, operate under extremely hostile and severe conditions that require better steels—indeed, steels which will withstand longer cyclic loading at higher loads and better resist wear. For these bearings, manufacturers have turned to high alloy steels, such as high speed steels or high carbon stainless steels. Certain alloying elements, such as chromium, in these steels unite with carbon to form carbides, and these carbides precipitate quite early in the transition from the molten state. They consolidate as the cooling continues to form rather large particles. Ingots of any steel cool slowly, and when ingots of high alloy steel cool, the carbides of chromium and other alloying metals grow, indeed, considerably larger than the particles of cementite or iron carbide one also finds in plain carbon steel. These carbides prevent the manufacturers from acquiring finely ground finishes along the raceways of the races, and this in turn degrades the fatigue performance of the bearings.

To be sure, procedures exist to reduce the size of carbides in steel, but these procedures have disadvantages. For example, rapid solidification will keep the carbides small, but ingots are much too massive to cool quickly enough too prevent the growth of large carbide particles. Also the particle size of carbides remains small when the bearing components are formed from powdered metal, but powder metallurgical procedures are quite costly.

Bearings do not represent the only machine components which experience cyclic stresses along critical surfaces—stresses which are conducive to spellings and fatigue failure. Gears, traction drives, and cams likewise see such loading, and along critical surface areas they should have a fine microstructure that is devoid of large carbide particles.

The present invention resides in a machine component that is formed from a high alloy steel, such as high speed steel or high carbon stainless steel, and operates under conditions which subject it to cyclic loading along one of its surfaces. The steel contains large carbide particles in its core, but along the surface that is subject to the cyclic loading, it has a glaze in which the carbide particles are quite small and the microstructure is otherwise quite fine—indeed, a dendritic network. The fine microstructure of the glaze retards spalling and thus extends the fatigue life of the component. To derive the glaze, a high energy beam is directed at the surface in the presence of an inert gas to momentarily melt the surface. The molten surface layer freezes almost instantaneously—or in other words is self-quenched—and as a consequence the carbides exist in the glaze at a much smaller size.

U.S. Pat. No. 3,737,565 considers the interaction of a high energy beam with a bearing surface. But the process of the present invention is unique and the results obtained from employing this invention are quite different from those derived from the process of U.S. Pat. No. 3,737,565. The process of that patent actually removes something from the steel to make a section of the steel cleaner. In particular, the melting is performed in a vacuum, so the total quantity of elements such as sulfur and aluminum is greatly reduced. The melting and rapid solidification utilized by the process of the present invention are performed at atmospheric pressure. An inert shielding gas prevents oxidation of the liquid. On utilizing the process, the chemical components within the steel are redistributed within the resulting glaze, but the chemical composition of the steel is not changed. The process is concerned with high speed steels and high carbon, high chromium stainless steel. By employing the process of the present invention a very fine dendritic microstructure is created in the glazed material. In addition, the very large alloy carbides in the original steel are greatly reduced in size in the glazed zone. Even after subsequent heat treating procedures, the alloy carbides within the glaze are small compared to the carbides in the core. The improved fatigue life resulting from the invention is due to a reduction in the size of the grains and alloy carbide particles and not the removal of any constituents or chemical species from the steel.

DESCRIPTION OF THE DRAWINGS

In the accompanying drawings which form part of the specification and wherein like numerals and letters refer to like parts wherever they occur.

FIG. 3a is a photograph showing in cross-section a bearing cone having a glaze on its raceway;

FIG. 3b is a photograph of the microstructure for the cone depicted in FIG. 3a at the juncture of the glaze and core;

FIG. 4a is a photograph showing in full section a rough machined, dimensionally oversized, cone having a glaze on its raceway;

FIG. 4b is a photograph of the microstructure for the glaze on the cone shown in FIG. 4a;

FIG. 4c is a photograph of the microstructure for the core of the cone shown in FIG. 4a;

FIG. 4e is a further enlargement of the core microstructure shown in FIG. 4c;

FIG. 6a is a photograph showing in cross-section the inner race of a ball bearing, with the inner race having a glaze along its raceway;

FIG. 6b is a photograph showing the microstructure of the glaze for the inner race illustrated in FIG. 6a; and FIG. 6c is a photograph showing the microstructure of the core for the inner race illustrated in FIG. 6a.

DETAILED DESCRIPTION

Figure 1:
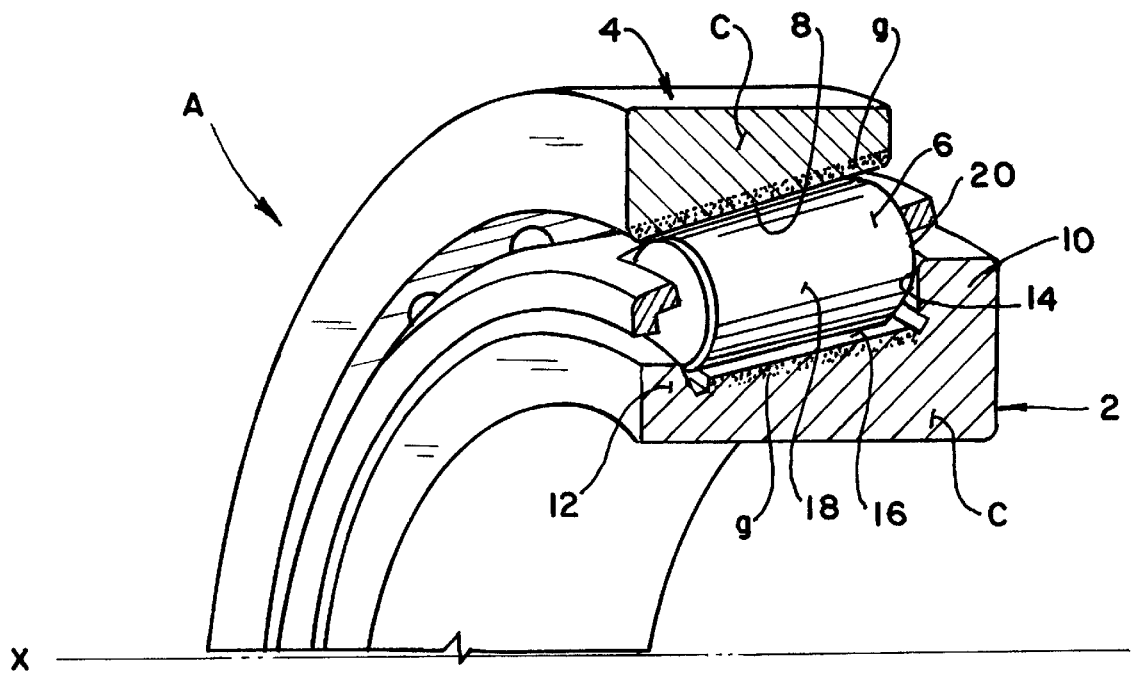
FIG. 1 is a fragmentary perspective view, broken away and in section, of a tapered roller bearing having glazes along the raceways of its cone and cup and also on its rollers.

A machine component, which is formed from a high alloy steel, such as high speed steel or high carbon stainless steel, has a critical surface along which it is subjected to cyclic stresses, and to enable the component to better withstand those stresses, the component has a refined microstructure along its critical surface. Being high alloy, the steel contains carbides which traditionally exist in rather large particle sizes—some larger than 25 μm (micrometers). Typical carbides constitute unions of carbon and other elements, mostly metals as diversified as chromium, tungsten, molybeleum and vanadium. For example, in high carbon stainless steels chromium represents the most prominent constituent of the carbides. When the steel is cooled slowly from a molten condition, many of the alloy carbides precipitate out of solution quite early and consolidate into extremely large particles, considerably larger than the cementite or iron carbide particles also found in the steel.

And the component, if it is formed from high alloy steel bar stock, will normally have large carbides of chromium and other alloying elements, because bar stock is traditionally derived from ingots which in turn are derived by cooling steel slowly from a molten condition. Indeed, the mass of an ingot precludes any other way of cooling. The slow cooling leaves the steel of the bar stock in an annealed condition, and in that condition it is machined to the desired configuration.

Thereafter the temperature of the machined component is elevated into the austenitic range for the alloy steel from which the component is formed and held at that temperature sufficiently long to enable all of the steel to transform into austenite. Once fully transformed, the steel is quenched to convert the austenite into martensite and retained austenite, but the alloy carbides remain essentially unchanged in size, for they do not dissolve to any measure in the austenite. For example, the component may be subjected to an oil quench or to a quench in molten salt or perhaps, to a quench in oil followed by liquid nitrogen. Next the steel of the component is tempered by heating it one or more times to a suitable tempering temperature below its lower critical temperature and allowing it to cool.

For a component made from a high speed steel, the treatment may consist of autenizing at a temperature as high as 2250° F. followed by a quench in salt at 1000° F. and then slow cooling to room temperature. Subsequently, the component may be tempered two times at temperatures as high as 1100° F.

For components made from high carbon stainless steel alloys, the hardening may involve austenitizing at a temperature as high as 2012° F. followed by a rapid quench in oil to room temperature and then further cooling in liquid nitrogen. Tempering is achieved by heating one or two times to 350° F.

The hardening and tempering leave the high alloy steel with physical characteristics one desires—namely, hardness, high tensile strength, reasonable ductility and perhaps greater resistance to corrosion. But the microstructure along the critical surface is not ideally suited for sustaining heavy stresses of a cyclic character. In this regard, the carbides of many of the alloying elements exist as relatively large particles throughout the component, and while these large carbide particles do not significantly affect the strength or hardness, they do promote spalling along the critical surface and in that sense are undesirable.

Perhaps chromium is the most common of all of the alloying agents. It unites with the carbon in steel to form chromium carbide. When steel containing moderate proportions of chromium is cooled slowly from a molten condition, the resulting particles of chromium carbide can assume considerable size, some measuring in excess of 25 μm. These carbide particles remain unchanged in size after the steel is heated to austenitic range and quenched to harden it. This is much too large for the critical surface to withstand sustained heavy loading of a cyclic character without spalling. The particle size along the critical surface should be considerably smaller. Even when the component is thereafter ground or machined along the critical surface to the final shape for that surface, the large particles of chromium carbide remain and detract from the capacity of the surface to resist spalling.

To provide a more acceptable microstructure at the critical surface, that surface is glazed. Basically, a laser beam is directed at the surface, preferably perpendicular at the area of impingement, with sufficient energy and intensity to melt the component and create a puddle in the localized zone illuminated by the laser. The component is moved such that the critical surface remains within the beam, but the area illuminated by the beam changes, so in effect the puddle advances along the surface. Many machine components having critical surfaces requiring refinement of microstructure are circular, so with such a component the movement is best achieved by rotating the component while keeping the surface in the beam. If the beam is not wide enough to illuminate the full width of the surface, several passes around the surface are required. Preferably, the first pass is circular and extends somewhat more than a full revolution, perhaps 1.1 to 1.3 revolutions, and succeeding passes are spiral in character until the last pass, which is also circular and somewhat exceeds a full revolution. Some lateral overlap exists between successive spiral passes so no gaps exist between the convolutions.

As long as relative movement exists between the laser beam and the surface, any zone of localized melting does not remain molten very long. Indeed, as the beam and the puddle produced by it move on, molten metal behind the illuminated zone quickly solidifies, for it rapidly looses heat to the underlying mass of metal or core that remains solid. The velocity of relative movement between the beam and the surface is such that the distance from the beam and the trailing edge of the puddle remains essentially constant.

In effect, the molten steel behind the advancing puddle undergoes a self-quench. The drop in temperature from the molten condition to the solidus temperature, occurs quickly enough to prevent the carbides, formerly in solution, from consolidating into large particles. Instead, they appear as very fine particles, generally the largest no greater than about 5 $\mu$m in length. The size of the largest newly formed carbides is less than one-fifth the size of the largest carbide particles in the underlying core of wrought steel, and preferably less than one-tenth the size of the largest carbide particles in the core.

The frozen surface layer or glaze consists primarily of fine martensite and retained austenite, with the fine carbide particles being uniformly dispersed. The laser glazing creates a very fine dendritic network, with the grain size of martensite and retained authenite in it being considerably smaller than the grain size of their counterparts in the underlying core of wrought steel—and of course the carbides are considerably smaller as well. The average grain diameter of the martensite and austenite in the core is generally no larger than 25 $\mu$m, whereas the average grain diameter in the glaze is generally smaller than 11 $\mu$m.

The component should have sufficient mass to produce a self-quench that results in the desired microstructure for the glaze. The laser glaze, which has the refined and improved metallurgical microstructure, should have a thickness at least 2 to 3 times the depth of the maximum shear stress experienced by the component as a consequence of the application of the cyclic load to it when the cyclic load is at its maximum rating. While the glazing must achieve a proper depth, it should not create excessive melting, that is melting which reconfigures the component or perhaps destroys it or melting which is so extensive that it produces cracking when the molten metal cools.

The melting which the laser produces occurs in an inert atmosphere to prevent constituents of the molten steel from oxidizing. To this end, the region of the critical surface illuminated by the laser is flooded with an inert gas that exists at atmospheric pressure.

For a component formed from high speed steel, once the glaze extends over the entire critical surface, the component is again tempered twice under conditions corresponding to the original temper. Where the steel of the component is so hard that it is likely to crack from residual stresses produced through cooling and phase transformation, the component immediately after undergoing the laser glazing, may be placed in a furnace at 1550° F. and cooled slowly to room temperature. Alternatively, once the laser glazing is completed, the laser may be defocused to serve as a source of heat to keep the component hot, although below the melting point, and thus allow the component to cool slowly through the critical transformation temperatures.

By the nature of their chemical composition, high carbon, high chromium stainless steels, such as 440C steels, are relatively poor conductors of heat. When these types of steels are laser glazed, a fine dendritic microstructure is achieved by the rapid self-quench of liquid transforming to solid. However, heat cannot be rapidly removed from the newly formed solid phase. As a result, these alloys cool at a relatively slow rate from the high solidus temperature to room temperature, and the dendritic microstructure of the glaze is composed of some non-martensitic constituents. In this condition the glazed microstructure is softer than a fully martensitic structure, but the material is too hard to machine. For these steels the component must first be annealed. The annealed component is then rough machined. After machining the component is then hardened and tempered in an identical manner to a similar component manufactured from a wrought alloy of similar composition. However, during the austenitizing and tempering cycles used and due to the slow diffusion rate of the metal alloying elements in iron, the dendritic microstructure is generally preserved. In addition, these thermal cycles lead to an insignificant change in the size of the very fine alloy carbide particles which formed during laser glazing. Thus, after austenitizing and tempering the high carbon stainless steels, the laser glazed microstructure is preserved.

After the tempering, the component along the glaze that forms its critical surface is ground to remove any irregularities resulting from the melting and quenching, and to correct any deformation.

One of the more important applications of the process of the present invention resides in the manufacture of antifriction bearings from high alloy steels, particularly the races for such bearings, for they experience cyclic stresses as the rolling elements move along them. A single row tapered roller bearing A, which establishes an axis x of rotation, is representative (FIG. 1). It basically includes an inner race or cone 2, an outer race or cup 4 encircling the cone 2, and tapered rollers 6 arranged in a single row between cone 2 and the cup 4. The cone 2 has a tapered raceway 8 which is presented outwardly away from the axis x and toward the cup 4, as well as a thrust rib 10 and a retaining rib 12 which project outwardly beyond the ends of the raceway 8. The thrust rib 10 has a rib face 14 along the large end of the raceway 8. The cup 4 has a tapered raceway 16 that is presented inwardly toward the axis x and as such faces the raceway 8 of the cone 2. The two raceways 8 and 16 lie within conical envelopes having their apices at a common point along the axis x. The rollers 6, fit between the tapered raceways 8 and 16 and indeed roll along the raceways 8 and 16 when the bearing A is set into operation. Each roller 8 has a tapered side face 18 and a large end face 20. The taper of the side face 18 is such that, generally speaking, line contact exists between the side face 18 and the two raceways 8 and 16. Thus, the envelope in which the tapered side face 18 lies will also have its apex at the common point along the axis x. The large end face 20 bears against the rib face 14 on the thrust rib 10.

The bearing A will transfer both radial and thrust loads, but normally the radial loads are the largest—and they act through a region of the cone 2 and cup 4 called the load zone which may occupy an arc of only a few degrees or may extend a full 360°, depending on the setting of the bearing A. Within the load zone the raceways 8 and 16 experience cyclic stress as the rollers 6 move along them, and these cyclic stresses encourage spalling. The raceways 8 and 16 of the cone 2 and cup 4, respectively, have a refined microstructure derived from laser glazing, and this enables them to better withstand the cyclic loading imposed by the rollers 6. In particular, the cone 2 has a core c of wrought steel, but along its raceway 8 has a glaze g that overlies a core c. Likewise, the cup 4 has a wrought steel core c and a glaze g that overlies a core c along the raceway 16.

Figure 2:
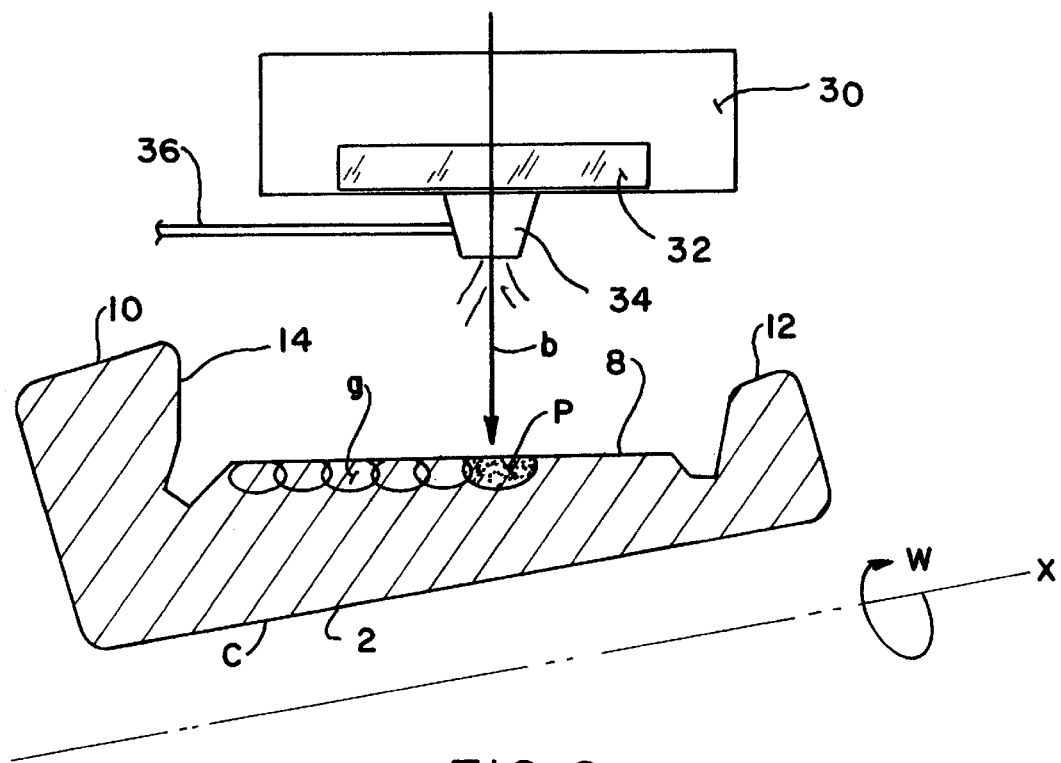
FIG. 2 is a schematic view showing a laser generator directing a beam at a bearing cone to impart a glaze to the cone along the raceway thereof.

To refine the microstructure along the raceway 8 of the cone 2, the cone 2 in a rough machined condition is mounted on a mandrel which rotates and, owing to the rotation, causes the cone 2 to revolve about its axis x (FIG. 2). With the cone 2 rotating, a laser beam b is directed at the raceway 8. The beam b emanates from a $CO_2$ laser generator 30 having a zinc selenide window 32 and a nozzle 34 which is connected through a tube 36 to a source of inert gas. The beam b which is produced by the laser generator 30 passes through the window 32 and through the nozzle 34 and also through a shield of inert gas discharged by the nozzle 34. The cone 2 is positioned such that its raceway 8 lies within the beam b and indeed is oriented such that the raceway 8 at the point where it is illuminated by the beam b is perpendicular to the beam b. Moreover, the raceway 8 is close enough to nozzle 34 to enable the gas discharged from the nozzle 34 to completely flood the zone illuminated by the beam b.

Other types of laser generators may be used to produce the beam b. Indeed, the beam 6 need not even be a laser beam, for any high energy beam that has the capacity to melt steel at atmospheric pressure in an inert gas atmosphere will suffice.

The beam b possesses enough energy and intensity to melt the cone 2 at its raceway 8, thus producing a puddle p along the raceway 8. But the cone 2 revolves about its axis x, and as a consequence, the point of impingement moves circumferentially along the raceway 8 and the puddle p of molten metal with it. The puddle p, once the beam passes beyond it, immediately freezes, owing to the mass of the cone 2 which lies behind it at room temperature, and this leaves a glaze g over an underlying core c. The surface velocity is such that the distance between the beam and the trailing edge of the puddle remains essentially constant. After 1.1 to 1.3 revolutions, the cone 2 is advanced axially so that the path of the illumination transforms from a circular direction to a spiral direction, but the pitch of the spiral path is less than the width of puddle p and the glazed strip that it produces, so that adjacent convolutions of the spiral strip overlap. The rotation and axial advancement continue until the glaze g occupies the entire raceway 8. The glaze g possesses a very fine dendritic network and the carbides of the various alloying elements, while present, exist as very fine particles.

The rib face 14 on the cone 2 may in a like manner be provided with a glaze, and if the laser generator 30 is powerful enough, the glaze may be produced in a single pass. However, the loads applied to the rib face 14 do not reach the magnitude of those applied to the raceways 8, so extending the glaze g to the rib face 14 is normally not necessary.

Likewise, the raceway 16 of the cup 4 is provided with a similar laser glaze g by rotating the cup 4 and advancing it axially with its raceway illuminated by the laser beam b produced by the generator 30. Also, each roller 6 may be provided with a glaze g along its tapered side face 18 by rotating it while its side face is illuminated by the beam b. The glaze g on each roller 6 may be extended to the large end face 20, but this is normally not necessary owing to the lesser loads resisted by the thrust rib 10.

EXAMPLE I

A group of cones 2 were rough machined from annealed VIM-VAR M50 high speed steel, which is available from Latrobe Steel Company of Latrobe, Pa. The steel has the following composition by weight:

| | |
|---|---|
| Carbon | 0.85% |
| Manganese | 0.30% |
| Silicon | 0.20% |
| Chromium | 4.10% |
| Molybdeum | 4.52% |
| Vanadium | 1.00% |
| Iron | remainder |

Each cone 2 was austenitized at 2150° F. for 5 minutes and then quenched into 1000° F. salt. After cooling to room temperature each cone 2 was double tempered at 1050° F. for 2 hours. The cone 2 was rotated at the angular velocity of 229.4 rev./min. about its axis x and traversed from the small end to the large end at a velocity of 2.29 in./min., all while illuminated with a laser beam b along its raceway 8. This corresponds to an average surface velocity of 800 in./min. The focal spot of the laser was 0.050 in. above raceway 8 of the cone 2. The flow rates of the argon and helium shielding gasses were 52.5 ft.$^3$/min. and 54.8 ft.$^3$/min. respectively. The laser power was 4.5 KW; the keying frequency was 5000 Hz. The processing time was approximately 12.0 sec.

After glazing each cone 2 was retempered twice at 1050° F. for two hours. A glaze having a minimum depth of 0.020 in. after final grinding and extending over the entire length of the raceway 8 was produced (FIG. 3a). The cone 2 after the final grind met the dimensional specifications for LM12749 cones sold by The timken Company of Canton, Ohio.

In the glaze a fine dendritic microstructure, containing very fine carbides tempered martensite and some retained austenite resulted (FIG. 3b). The constituents of the wrought core c were tempered martensite, some retained austenite and large primary carbides (FIG. 3b). The hardness of the glaze g after performance testing was 783 Knoop, while the hardness of the core c was 750 Knoop. No cracks, porosity or microstructural defects were observed in the glaze g.

Conventional LM 12749 cones from the same steel were fabricated, but at their raceways did not have a laser glaze. The fatigue lives of the standard cones were compared to the fatigue lives of the laser glazed cones. The results were as follows:

| Load Rating | Fatigue Life (million rev.) | |
|---|---|---|
| | Conventional | Glazed |
| 200% | 30.6 | 99.7 |
| 300% | 2.4 | 14.8 |

Fatigue life represents the number of revolutions required to produce a fatigue spall of 0.01 in$^2$ and is often designated by the symbol $L_{10}$.

The tests indicated that the laser glazing increased fatigue life nearly seven times. The fine dendritic microstructures in the glaze g remained clearly evident after the fatigue tests.

EXAMPLE II

The parameters and cones 2 described in Example 1 were used; however, glazing was performed so that the beam b moved from the large end to the small end of their raceways 8. The glaze g was very uniform in thickness, and the minimum depth was 0.025 in. When bearing fatigue lives of conventionally processed cone were compared to the glazed cones 2, the results were as follows:

| Load | Fatigue Life (million rev.) | |
|---|---|---|
| Rating | Conventional | Glazed |
| 200% | 30.6 | 144.6 |
| 300% | 2.4 | 19.8 |

In this instance, the processing by laser glazing increased the fatigue life of the glazed bearings by eight times.

EXAMPLE III

Figure 4C:
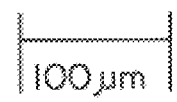
Figure 4D:
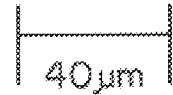
FIG. 4d is a further enlargement of the glaze microstructure shown in FIG. 4b.

Another group of LM 12749 cones 2 were rough machined from annealed VIM-VAR M50 high speed steel hardened and tempered. The cones 2 were approximately 0.040 in. oversized in diameter compared to the final dimensions of the component. The cones 2 were rotated at an angular velocity of 114.7 rev./min., about their axes x. The glazing was from the small end to the large end of the cone raceway 8. The average surface velocity of the glazing was 400 in./min. The cone 2 was moved at a velocity of approximately 3.3 in./min.; this corresponds to an advancement of 0.030 in. in the axial direction per revolution. The flow rates of the argon and helium shielding gas were 52.5 ft.$^3$/min. and 82.2 ft.$^3$/min. respectively. The laser power was 4960 W. and the keying frequency was 5000 Hz. The laser beam b impinged on the cone 2 for approximately 1.0 sec. before the translation in the X direction commenced. After traversing the length of the rough machined component, translation in the X direction was terminated, and the beam power was reduced to 0.0 W. in 0.5 sec., the purpose of the ramp down after glazing being to prevent the formation of a deep hole at the end of the component. The approximate glazing time was 7.25 sec.; a total time of 7.75 sec. including the ramp down cycle. After glazing the cones 2 were doubled tempered at 950° F. for 2 hours and for another 2 hours. The hardness of the glaze g was 757.9 Knoop and the hardness of the core c was 801.9 Knoop. The thickness of the glaze g in the rough machined condition was 0.055 in. (FIG. 4a). The glaze g contained fine dentrites and small alloy carbines (FIGS. 4b & 4d). The core c contained large alloy carbides (FIGS. 4c & 4e).

EXAMPLE IV

Figure 5:
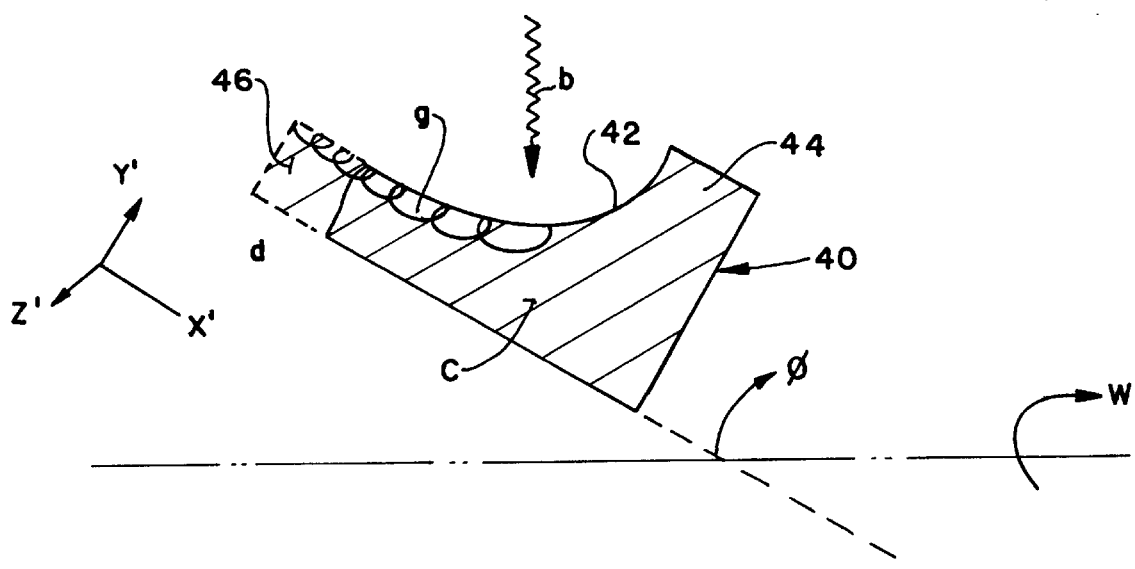
FIG. 5 is a schematic view showing a glaze being applied to the inner race of a ball bearing along a raceway thereof.

A laser beam b was impinged upon a #207 split inner race 40 manufactured from hardened M50 VIM-VAR high speed steel (FIG. 5). The race 40 had a raceway 42 located between a large end portion 44 and a small end portion 46. The standard geometry of the race 40 was modified so that extra material was added to the small end portion 46. The race 40 was rotated about its own longitudinal axis x' at the constant angular velocity. Initially the laser beam impinged on the component in the excess material of the small end portion 46, for approximately 1.5 revolutions after which the component was rotated about an axis Z' located perpendicular to the axis X'. Simultaneous rotation about the axis Z' in conjunction with rotation about the axis X' were such that the beam b traversed the raceway 42 at the constant surface speed. Relative motion of laser generator 30 and translation in the direction X' maintained a constant position of the laser focus spot with respect to the raceway 42. By using an angular velocity of 54.5 revolutions per minute, and an index of 0.025 in. per revolution of the component, laser glazing on the surface of the race was performed at the surface velocity of 300 in./min. The laser power was 3420 W. and the keying frequency was 5000 Hz. The focal spot was 0.020 in. above the raceway 42. The flow rates of argon and helium shielding gas were 52.5 and 109.6 ft.$^3$/min. respectively. The depth of the laser glaze g was 0.055 in. The race 40 were doubled tempered at 950° F. for 2 hours and again for another 2 hours. The hardness of the material in the glaze g was 736.6 Knoop and the hardness of the wrought core c was 790.4 Knoop.

EXAMPLE V

A group of 207 inner races for ball bearings were fabricated from annealed 440C stainless steel which had the following composition by weight:

| Carbon | 1.00% |
|---|---|
| Manganese | 0.50% |
| Silicon | 0.75% |
| Chromium | 17.00% |
| Molybdeum | 0.50% |
| Iron | remainder |

The processing was performed on the annealed specimens. The methodology employed was similar to that described in Example IV. The glazing surface velocity was 300 in./min. and the index was 0.025 in. The laser power was 3420 W. and the keying frequency was 5000 Hz. The inner races were austenitized at 2012° F. for one hour, oil quenched and refrigerated at –320° F. Subsequently, the components were double tempered at 350° F. for two hours and again for another two hours. A grind followed to give each inner race its final shape. After the grind the minimum depth of the laser glaze g was 0.025 in.

Figure 6B:
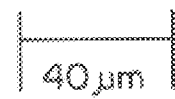
Figure 6C:
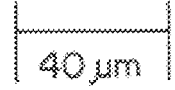

The microstructure in the glaze g consisted of tempered martensite and some retained austenite in a fine dendritic network and very fine well-dispersed carbide particles (FIG. 6b). In the core c of wrought steel, the microstructure was composed of tempered martensite, retained austenite and large carbide particles (FIG. 6c).

EXAMPLE VI

A group of 440C annealed stainless steel bars were machined to a diameter of 0.546 in. and a length of 24 in. The bars were rotated at an angular velocity of 175 rev./min. The bars were traversed in the axial direction at 5.2 in./min., so that the bars moved 0.035 in. per revolution. The laser power was 3335 W. and the keying frequency was 5000 Hz. The focal position was 0.010 in. above the bar. The argon and helium shielding gas flow rates were 52.2 and 109.6 ft.$^3$/min. respectively. Using this invention approximately 19 in. of each bar was laser glazed. The processing time for each bar was approximately 3.46 min. After machining to a diameter of 0.520 in., the glazed depth was 0.070 in. The bars were used to fabricate SR6R7-010 miniature bearing inner races. The specimens were austenitized at 2012° F., quenched into ice water, cold treated and double tempered at 302° F. The laser glaze had a hardness of 760 Knoop and contained 13.2% retained austenite. The core contained 4.3% retained austenite and had a hardness of 740 Knoop. The microstructure of the glaze was composed of martensite, retained austenite and very fine carbide particles in a fine dendritic matrix. The core c consisted of tempered martensite, retained austenite and large carbide particles.

When the laser was set up such that the focal spot of the beam was 0.030 in. above the bar, for a surface velocity of 300 in./min., using the same parameters at 3530 W. input power and 3475 W. input power, melting of the entire portion of the bar occurred. Reducing the power to 3420 W.

resulted in a glaze of good quality. The depth of the glaze was less than 0.060 in. By changing the focal spot to 0.010 in. above the specimen, a high quality glaze having a depth of 0.070 in. was achieved. In producing these types of components, a smoother glazed surface is achieved when the beam focal spot is 0.030 in. above the bar as compared to being only 0.010 in. above the surface of the bar. Hence, as the focal spot is moved away from the surface of the bar, the depth of penetration decreases.

This invention is intended to cover all changes and modifications of the example of the invention herein chosen for purposes of the disclosure which do not constitute departures from the spirit and scope of the invention.

What is claimed is:

1. A machine component having a critical surface along which it is subjected to cyclical loading, the machine component being formed from a high alloy steel containing alloy carbide particles and having a core and along its critical surface having a glaze which lies uninterrupted over a substantial portion of the core, with the glaze having substantially uniform depth over its width and having been formed by melting high alloy steel over the core, the chemical composition of the steel in the core and the glaze being substantially the same, the microstructure of the steel in the glaze differing from the microstructure of the steel in underlying core in that alloy carbide particles in the glaze are substantially smaller than the alloy carbide particles of the core and the glaze has a dendritic structure.

2. A machine component according to claim 1 wherein the length of longest alloy carbide particles in the glaze are less than one-fifth the length of the longest alloy carbide particles in the core.

3. A machine component according to claim 2 wherein the glaze contains martensite and retained austenite in a very fine dendritic network.

4. A machine component according to claim 2 wherein the core contains martensite and retained austenite having an average grain diameter generally no larger than 25 μm and the martensite and austenite in the glaze has an average grain diameter generally smaller than 11 μm.

5. A machine component according to claim 1 wherein the molten steel on the component was self-quenched by a transfer of heat from the molten steel to the underlying core.

6. The machine component according to claim 5 wherein the steel along the critical surface was heated to a molten condition and self-quenched by directing an energy beam at a localized area of the critical surface to produce a puddle of molten steel in the localized area, and effecting relative movement between the component and the beam so that the puddle advances along the critical surface.

7. The machine component of claim 1 in combination with rolling elements which roll along the critical surface and apply the cyclic loading.

8. A bearing comprising: a first race having a raceway; a second race having a raceway presented toward the raceway of the first race, the second race being formed from a high alloy steel containing carbide particles, the second race having a core and along its raceway an uninterrupted glaze that overlies the core, with the glaze having substantially uniform depth across the entire raceway and having been formed by melting high alloy steel over the core, the chemical composition of the steel in the core and glaze being substantially the same, the microstructure of the steel in the glaze differing from the microstructure of the steel in the underlying core of the race, in that alloy carbide particles in the glaze are substantially smaller than the alloy carbide particles of the core and in that the glaze has a dendritic network; and rolling elements located between the races and contacting the races along their raceways, so that one of the races may rotate relative to the other race with minimum friction.

9. A bearing according to claim 8 wherein the first race is formed from high alloy steel which contains alloy carbide particles, and wherein the first race has a core and along its raceway an uninterrupted glaze that overlies the core, with the glaze having substantially uniform depth across the raceway and having been formed by melting high alloy steel over the core, the chemical composition of the steel in the core and the glaze of the first race being substantially the same, the microstructure of the steel in the glaze of the first race differing from the microstructure of the steel in the underlying core of the first race in that the alloy carbide particles in the glaze are substantially smaller than the alloy carbide particles of the core and in that the glaze has a dendritic structure.

10. A bearing according to claim 9 wherein the microstructure for the glaze of the first race is finer than the microstructure in the core of the first race, and the microstructure for the glaze in the second race is finer than the microstructure in the core of the second race.

11. A bearing according to claim 8 wherein the glaze is derived by directing a beam of radiation at the raceway of the second race with sufficient energy and intensity to melt the steel of second race at the raceway of the race, such that a puddle develops along the raceway, and effecting relative movement between the beam and race such that the puddle advances over the raceway, and allowing the molten steel of the puddle to self-quench as the beam moves beyond the puddle.

12. A bearing according to claim 8 wherein the raceways are tapered and the rolling elements are tapered.

13. A process for improving the microstructure of high alloy steel in a machine component along a surface thereof that will be subject to cyclic loading, said process comprising: while the surface is subjected to substantially atmospheric pressure, directing a beam of radiation at the surface, with the beam having enough energy to melt the high alloy steel at the surface and below the surface, while substantially more high alloy steel remains solid below the molten steel as a core; and effecting movement between the beam and the machine component such that the beam moves over the surface in multiple side-by-side passes and melts the high alloy steel as it does and enables the underlying core to absorb heat from the molten steel heated by the beam, with extraction of heat from the molten metal that is beyond the beam being rapid enough to quickly solidify the molten steel into an uninterrupted glaze that has substantially uniform depth over its width and a dendritic microstructure, yet the same chemical composition as the core.

14. The process according to claim 13 wherein the depth of the glaze is at least two times the depth of the maximum shear stress experienced by the component as a consequence of the application of the cyclic load to it when the cyclic load is at its maximum rating.

15. A machine component according to claim 1 wherein the depth of the glaze is at least two times the depth of the maximum shear stress experienced by component as a consequence of the application of the cyclic load to it when the cyclic load is at its maximum rating.

16. A bearing according to claim 8 wherein the depth of the glaze is at least two times the depth of the maximum shear stress experienced by the second race as a consequence of the application of the cyclic load to it by the rollers when the cyclic load is at its maximum rating.

17. A process according to claim 13 wherein a microstructure of the glaze is substantially finer than the microstructure of the underlying core.

18. A process according to claim 13 wherein the heating includes directing a laser beam at the surface with sufficient energy and intensity to melt the steel at the surface and form a puddle on the surface where the beam illuminates the surface, and effecting movement between the machine component and the beam so that other areas of the surface are illuminated by the laser beam.

19. A process according to claim 18 and further comprising tempering the steel of the component after quenching.

20. The process according to claim 13 wherein the steel contains the carbide of chromium.

21. A process according to claim 13 wherein the heating to a molten condition occurs in the presence of a gas that prevents the constituents of the molten steel from oxidizing, with the gas being substantially at atmospheric pressure.

22. A bearing according to claim 8 wherein the high alloy steel in the core of the second race is wrought steel.

* * * * *